G. SCHUMACHER.
METHOD OF PROTECTING WOOD IN SALT WATER.
APPLICATION FILED DEC. 14, 1911.
1,039,824.
Patented Oct. 1, 1912.
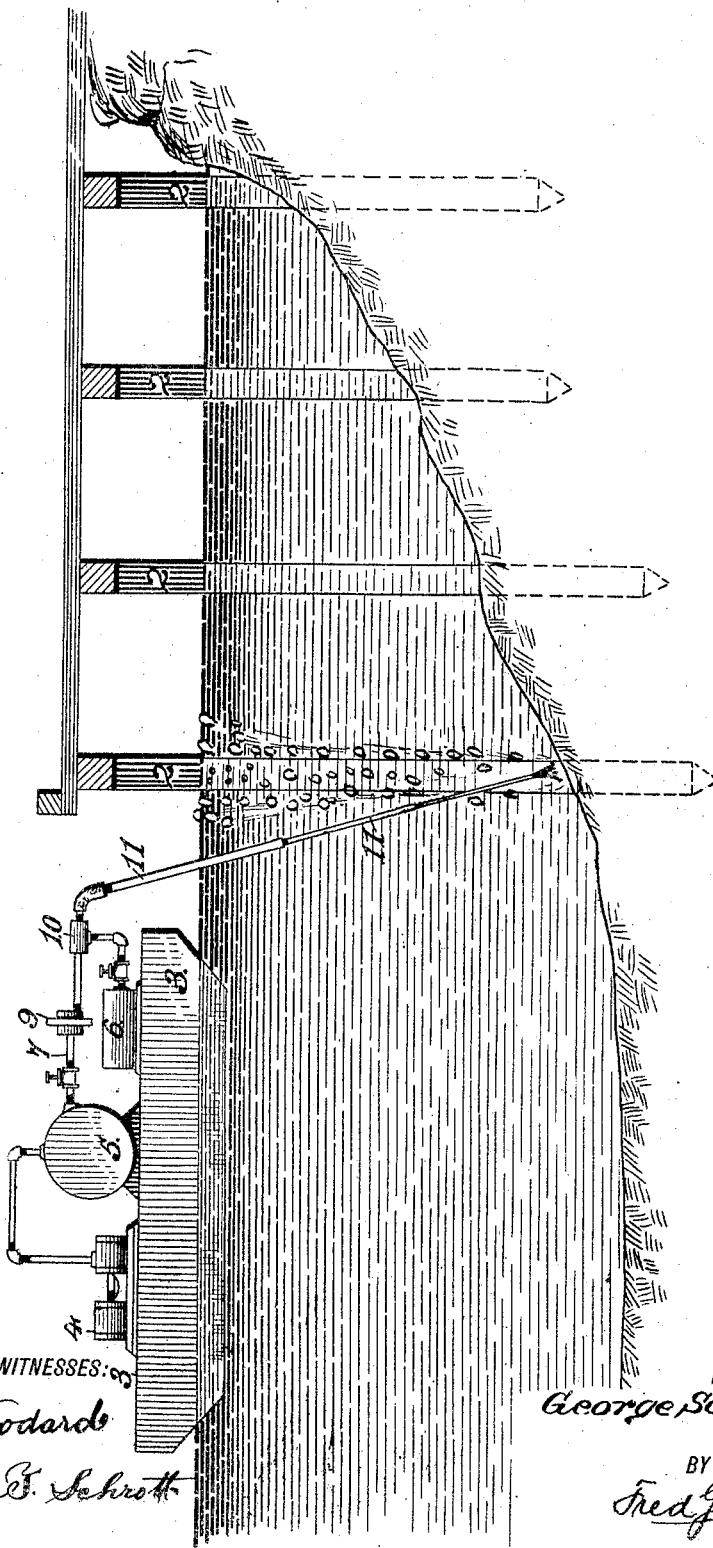
WITNESSES:
H. Woodard
John F. Schrott
INVENTOR
George Schumacher
BY
Fred G. Dieterich
ATTORNEYS

UNITED STATES PATENT OFFICE.

GEORGE SCHUMACHER, OF VANCOUVER, BRITISH COLUMBIA, CANADA.

METHOD OF PROTECTING WOOD IN SALT WATER.

1,039,824.

Specification of Letters Patent.     Patented Oct. 1, 1912.

Application filed December 14, 1911. Serial No. 665,766.

*To all whom it may concern:*

Be it known that I, GEORGE SCHUMACHER, a citizen of the Dominion of Canada, residing at Vancouver, in the Province of British Columbia, Canada, have invented a new and useful Pile Protection Against Teredos and the Like, of which the following is a specification.

This invention relates to a method for protecting wood in sea water from the attack of the teredo, or other marine pests, such as barnacles, seaweed, etc.

It has been demonstrated that chlorin gas dissolved in small quantities in the water is destructive of the lower forms of marine animal and vegetable life, and as this gas can be obtained at a very low cost it is naturally suitable for the purpose of protection here referred to if it can be applied in a manner that will effect the desired result. The difficulties in this application are, that as the specific gravity of chlorinated sea water is slightly greater than that water in the natural state, if the chlorination is effected toward the bottom of the pile, or ground line, where the attack of the teredo is first and most strongly made, the protection may not extend much above that part of the pile; and if the chlorination of the water is effected at or adjacent to the surface of the water the tidal currents will carry the chlorinated water away from the structure of the pile before it descends to the ground level. These difficulties in application I have overcome by associating chlorin gas with compressed air, and by delivering the compressed air and chlorin gas at or adjacent to the lower level of the structure. In this practice the compressed air, owing to its specific levity, will, when delivered, immediately ascend through the water to the surface and in that ascent the chlorin gas will be dissolved in the water. The chlorination of the water in the immediate vicinity of the structure and from the lower to the higher level of it will thus be effected.

The particular apparatus, by which this chlorination is carried into practical effect is not yet fully worked out but will be somewhat as follows: In reference to the drawing, which accompanies this specification, 2 represents a wharf structure of wooden piles, the ground line and water level being indicated. In order to render the apparatus portable so as to be applicable over an extent of wharfage in a harbor, (for it must be understood that the treatment only requires to be periodic), the apparatus is preferably as shown in the drawing herewith; mounted on a barge or scow represented by 3. Mounted on this barge 3 is an air pump 4 delivering into a reservoir 5. Adjacent to this is a cylinder 6 containing chlorin gas, connection from which cylinder is made to a pipe 7 from the compressed air reservoir 5, the delivery of both compressed air and chlorin being controlled by suitable valves. A reducing valve 9 should be introduced in the connection 7 from the compressed air reservoir by which the pressure of the air to be delivered, when chlorinated, may be regulated, irrespective of the pressure in the reservoir, to be slightly in excess of that necessary to deliver in the required depth of water. After chlorination of the air, which may be effected by combining nozzles at the connection 10 of the two pipes, the chlorinated air is delivered to the foot of the pile structure by a pipe 11 which may be pivotally connected at the barge and may be telescopic so as to be extensible to varying depths.

The chlorin gas may be generated on the barge by any approved method or may be furnished by manufacturers in a dry compressed form in suitable containers.

The manner of admixture of the gas with the medium of delivery or the particular manner by which the delivery below water is effected is not material to the subject matter of this invention, the substance of which is the delivery below water of chlorin gas in association with a medium that will carry it to the surface immediately on delivery and that will allow the chlorin to mix readily with the sea water during such ascent.

Having now particularly described the nature of this invention and the manner of its possible application to effect the desired object, I hereby declare that what I claim as new and desire to be protected in by Letters Patent, is:

1. A method of protecting wooden articles in salt water which consists in delivering to a point adjacent to the lower end of said article chlorin gas in association with a medium specifically lighter than the water, and which will not unite with the chlorin or readily dissolve in or unite with the water.

2. A method for protecting wooden articles in salt water which consists in delivering to a point adjacent to the lower end of said article beneath the surface of the water, compressed air mixed with chlorin gas.

In testimony whereof I have signed my name to this specification in the presence of two subscribing witnesses.

GEORGE SCHUMACHER.

Witnesses:
ROWLAND BRITTAIN,
W. B. ELLIS.